(12) United States Patent
Akaha et al.

(10) Patent No.: US 10,195,750 B2
(45) Date of Patent: Feb. 5, 2019

(54) ROBOT AND ROBOT SYSTEM

(71) Applicant: Seiko Epson Corporation, Tokyo (JP)

(72) Inventors: Kazushige Akaha, Azumino (JP); Kazuto Yoshimura, Matsumoto (JP)

(73) Assignee: Seiko Epson Corporation (JP)

( * ) Notice: Subject to any disclaimer, the term of this patent is extended or adjusted under 35 U.S.C. 154(b) by 207 days.

(21) Appl. No.: 15/080,923

(22) Filed: Mar. 25, 2016

(65) Prior Publication Data

US 2016/0288335 A1 Oct. 6, 2016

(30) Foreign Application Priority Data

Mar. 31, 2015 (JP) .................................. 2015-071203

(51) Int. Cl.
*B25J 9/04* (2006.01)
*B25J 21/00* (2006.01)

(52) U.S. Cl.
CPC .............. *B25J 21/00* (2013.01); *B25J 9/046* (2013.01)

(58) Field of Classification Search
CPC ... B25J 9/045; B25J 9/046; B25J 9/047; B25J 17/025; B25J 21/005
USPC ..................... 414/732, 735, 738, 739, 740
See application file for complete search history.

(56) References Cited

U.S. PATENT DOCUMENTS

| | | | | |
|---|---|---|---|---|
| 6,041,274 A | * | 3/2000 | Onishi | G01B 11/005 318/580 |
| 9,037,293 B2 | | 5/2015 | Gomi et al. | |
| 2003/0221504 A1 | * | 12/2003 | Stoianovici | B25J 9/06 74/490.04 |
| 2016/0288335 A1 | * | 10/2016 | Akaha | B25J 21/00 |
| 2016/0288341 A1 | * | 10/2016 | Akaha | B25J 9/0018 |
| 2016/0288342 A1 | * | 10/2016 | Akaha | B25J 21/00 |
| 2016/0311107 A1 | * | 10/2016 | Yoshimura | B25J 9/0018 |
| 2016/0311120 A1 | * | 10/2016 | Goto | B25J 19/0029 |
| 2016/0318179 A1 | * | 11/2016 | Komatsu | B25J 9/0018 |
| 2017/0066129 A1 | * | 3/2017 | Motoyoshi | B25J 9/1651 |
| 2017/0120444 A1 | * | 5/2017 | Motoyoshi | B25J 9/1641 |
| 2017/0120458 A1 | * | 5/2017 | Akaha | B25J 9/0009 |
| 2017/0291297 A1 | * | 10/2017 | Miyasaka | B25J 9/047 |

(Continued)

FOREIGN PATENT DOCUMENTS

| | | | | |
|---|---|---|---|---|
| FR | 1371685 A | * | 9/1964 | B25J 9/046 |
| JP | 59-232779 A | | 12/1984 | |

(Continued)

*Primary Examiner* — Saul Rodriguez
*Assistant Examiner* — Brendan P Tighe
(74) *Attorney, Agent, or Firm* — Harness, Dickey & Pierce, P.L.C.

(57) ABSTRACT

A robot includes: a base which is provided on a first surface; and a robot arm which is provided on the base, in which the robot arm includes an n-th arm and an (n+1)th arm, in which the n-th arm rotates around an n-th rotating axis, in which the (n+1)th arm is provided to rotate around an (n+1)th rotating axis which is an axial direction different from an axial direction of the n-th rotating axis, in the n-th arm, in which the length of the n-th arm is longer than the length of the (n+1)th arm, and, when viewed from the axial direction of the (n+1)th rotating axis, the n-th arm and the (n+1)th arm overlap each other, and in which a connection part between the base and the robot arm is positioned above the first surface in a vertical direction.

8 Claims, 11 Drawing Sheets

(56) References Cited

U.S. PATENT DOCUMENTS

| | | | |
|---|---|---|---|
| 2018/0001487 A1* | 1/2018 | Miyasaka | B25J 9/126 |
| 2018/0147719 A1* | 5/2018 | Akaha | B25J 9/0009 |
| 2018/0194009 A1* | 7/2018 | Kojima | B25J 9/1692 |
| 2018/0222041 A1* | 8/2018 | Aoyama | B25J 9/043 |
| 2018/0236671 A1* | 8/2018 | Yoshimura | B25J 19/0029 |

FOREIGN PATENT DOCUMENTS

| | | |
|---|---|---|
| JP | 09-141592 A | 6/1997 |
| JP | 2001-237306 A | 8/2001 |
| JP | 2005-236218 A | 9/2005 |
| JP | 2008-302452 A | 12/2008 |
| JP | 2014-046401 A | 3/2014 |

* cited by examiner

ROBOT AND ROBOT SYSTEM

BACKGROUND

1. Technical Field

The present invention relates to a robot and a robot system.

2. Related Art

In the related art, a robot provided with a robot arm is known. In the case of the robot arm, a plurality of arms (arm members) are linked to each other via a joint portion, and, for example, a hand is mounted on the arm furthest on the tip end side (the most downstream side) as an end effector. The joint portion is driven by a motor, and the arm rotates by the driving of the joint portion. In addition, the robot grabs an object by the hand, moves the object to a predetermined position, and performs predetermined work, such as assembly.

As such a robot, in JP-A-2014-46401, a vertical articulated robot is disclosed. The robot described in JP-A-2014-46401 is configured to perform an operation of moving a hand with respect to a base to a position which is different by 180° around a first rotating axis that is a rotating axis (rotating axis that extends in a vertical direction) furthest on the base end side (most upstream side), by rotating a first arm which is the arm furthest on the base end side with respect to the base around the first rotating axis.

In the robot described in JP-A-2014-46401, when moving the hand with respect to the base to the position which is different by 180° around the first rotating axis, a large space for preventing interference of the robot is necessary.

SUMMARY

An advantage of some aspects of the invention is to provide a robot and a robot system in which an operation of moving a position of a tip end portion of a robot to a position different by 180° around a first rotating axis can be realized, even when the space for preventing interference of the robot is small.

The invention can be implemented as the following forms or application examples.

APPLICATION EXAMPLE 1

A robot according to this application example of the invention includes: a base which is provided on a first surface; and a robot arm which is provided on the base, in which the robot arm includes an n-th (n is an integer which is equal to or greater than 1) arm and an (n+1)th arm, in which the n-th arm rotates around an n-th rotating axis, in which the (n+1)th arm is provided to rotate around an (n+1)th rotating axis which is an axial direction different from an axial direction of the n-th rotating axis, in the n-th arm, in which the length of the n-th arm is longer than the length of the (n+1)th arm, and, when viewed from the axial direction of the (n+1)th rotating axis, the n-th arm and the (n+1)th arm overlap each other, and in which a connection part between the base and the robot arm is positioned above the first surface in a vertical direction.

With this configuration, it is possible to reduce the space for preventing interference of the robot when the tip end of the (n+1)th arm is moved to a position different by 180° around the n-th rotating axis.

In addition, by installing the robot on a floor, a workbench, or ground of an installation space, it is possible to simplify the configuration for installing the robot, and to easily and rapidly perform installation work of the robot.

APPLICATION EXAMPLE 2

In the robot according to the application example of the invention, it is preferable that a tip end of the robot arm is moved from a first position to a second position different by 180° around the n-th rotating axis via a state where an angle made by the n-th arm and the (n+1)th arm becomes 0° when viewed from the axial direction of the (n+1)th rotating axis, by rotating the (n+1)th arm without rotating the n-th arm.

With this configuration, it is possible to reduce the space for preventing interference of the robot when the tip end of the robot arm is moved to the second position from the first position.

APPLICATION EXAMPLE 3

In the robot according to the application example of the invention, it is preferable that a tip end of the robot arm moves in a horizontal direction.

With this configuration, it is possible to perform various types of work.

APPLICATION EXAMPLE 4

In the robot system according to the application example of the invention, it is preferable that a tip end of the robot arm moves in the vertical direction.

With this configuration, it is possible to perform various types of work.

APPLICATION EXAMPLE 5

In the robot system according to the application example of the invention, it is preferable that the first surface is parallel to a horizontal surface.

With this configuration, it is possible to simplify the configuration for installing the robot, and to easily and rapidly perform installation work of the robot.

APPLICATION EXAMPLE 6

A robot system according to this application example includes: a cell which includes a first surface; and a robot which includes a base provided on the first surface, and a robot arm provided on the base, in which the robot arm includes an n-th (n is an integer which is equal to or greater than 1) arm and an (n+1)th arm, in which the n-th arm rotates around an n-th rotating axis, in which the (n+1)th arm is provided to rotate around an (n+1)th rotating axis which is an axial direction different from an axial direction of the n-th rotating axis, in the n-th arm, in which the length of the n-th arm is longer than the length of the (n+1)th arm, and, when viewed from the axial direction of the (n+1)th rotating axis, the n-th arm and the (n+1)th arm overlap each other, and in which a connection part between the base and the robot arm is positioned above the first surface in a vertical direction.

With this configuration, it is possible to reduce the space for preventing interference of the robot when the tip end of the (n+1)th arm is moved to a position different by 180° around the n-th rotating axis. According to this, it is possible to reduce the size of the cell, and to reduce the size of the installation space for installing the robot system.

In addition, by installing the robot on a floor in the cell, a workbench, or the like, it is possible to simplify the configuration for installing the robot, and to easily and rapidly perform installation work of the robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot and a robot system according to the invention will be described in detail based on appropriate embodiments illustrated in the attached drawings.

Figure 1:
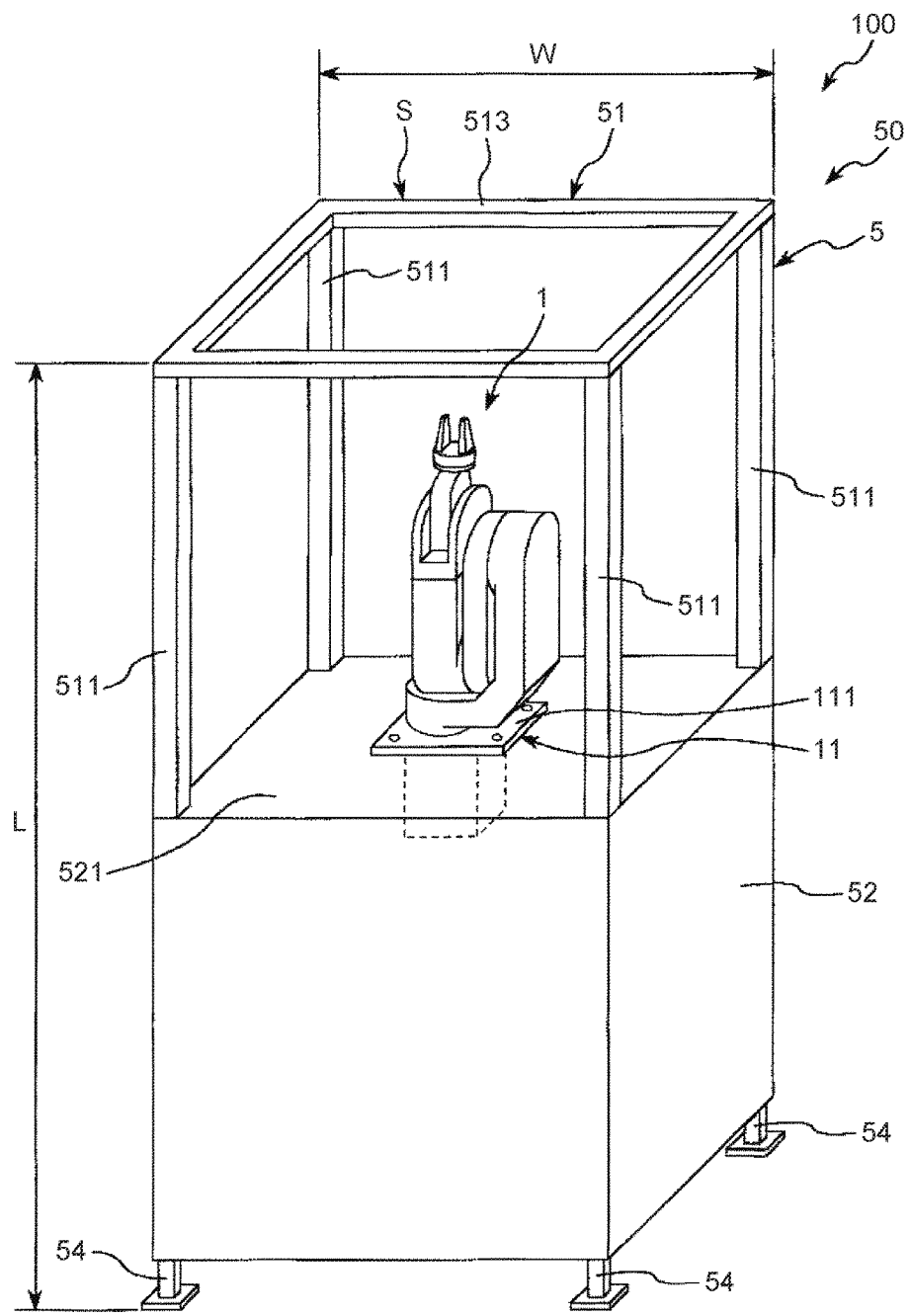
FIG. 1 is a perspective view illustrating an embodiment of a robot system according to the invention.
Figure 2:
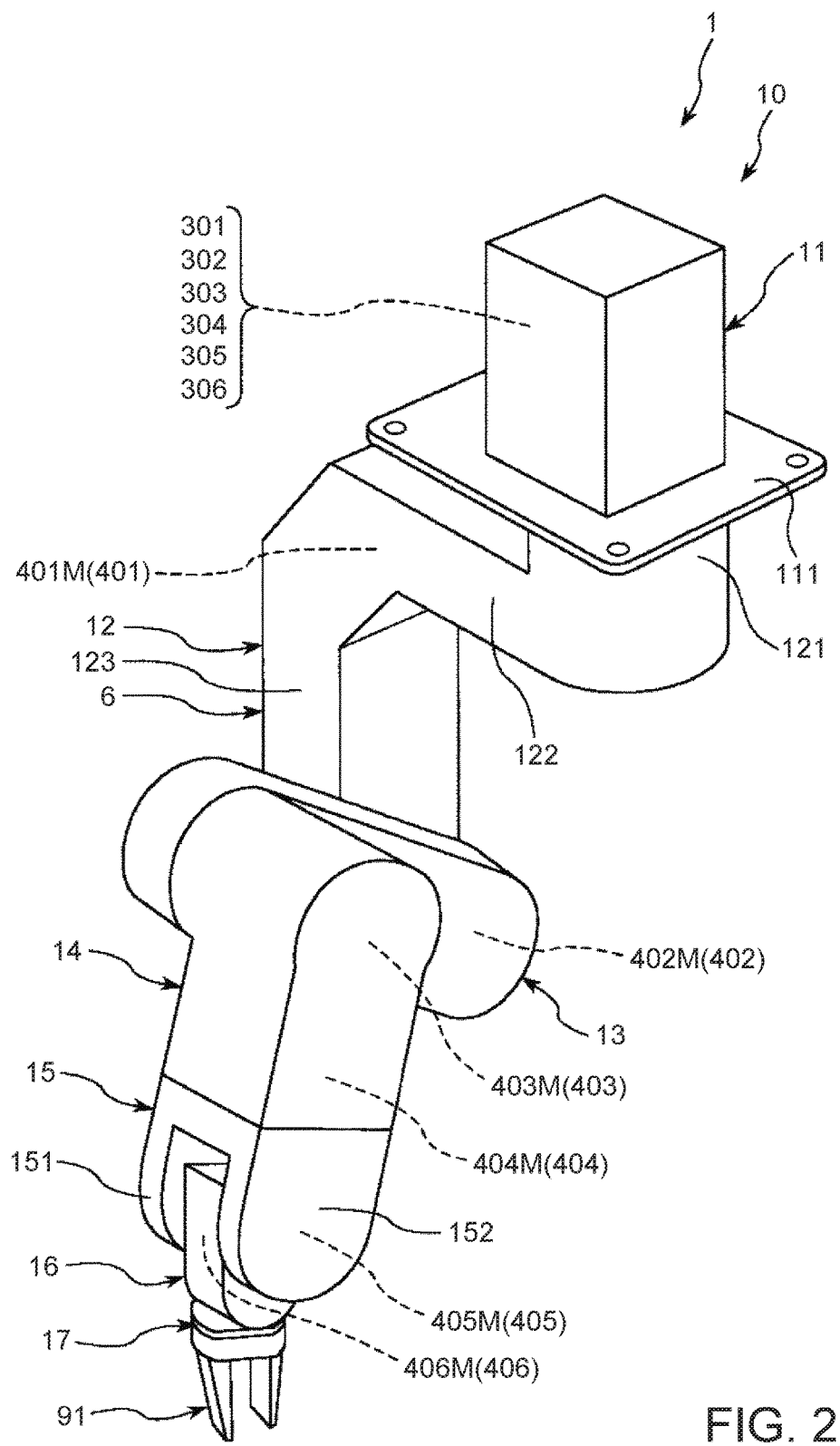
FIG. 2 is a perspective view of a robot of the robot system illustrated in FIG. 1.
Figure 3:
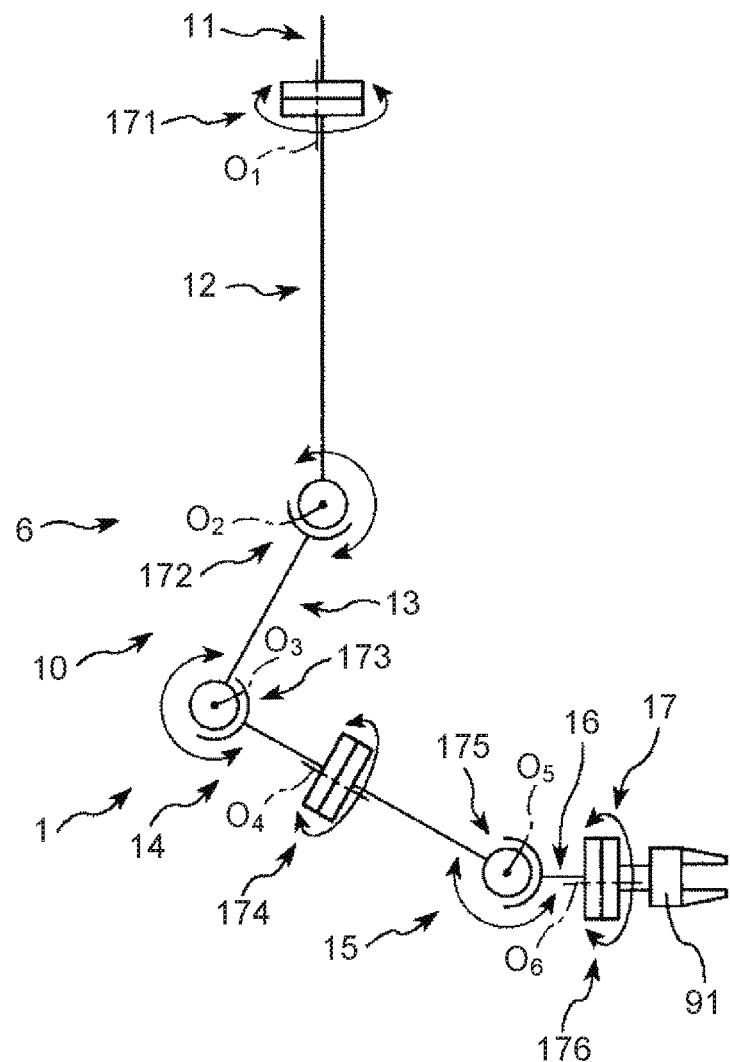
FIG. 3 is a schematic view of the robot of the robot system illustrated in FIG. 1.
Figure 4:
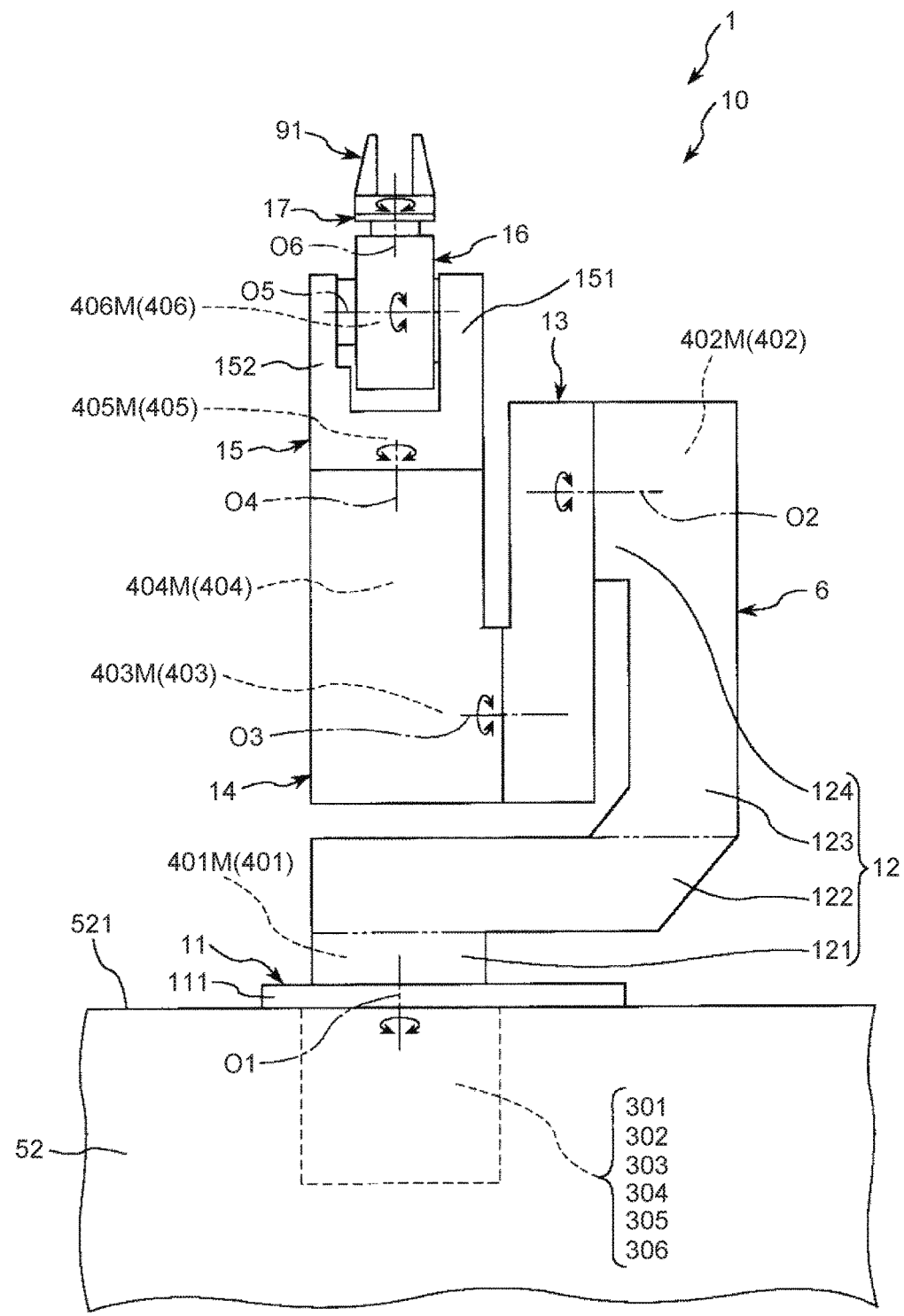
FIG. 4 is a view of the robot in a front view of the robot system illustrated in FIG. 1.
Figure 5:
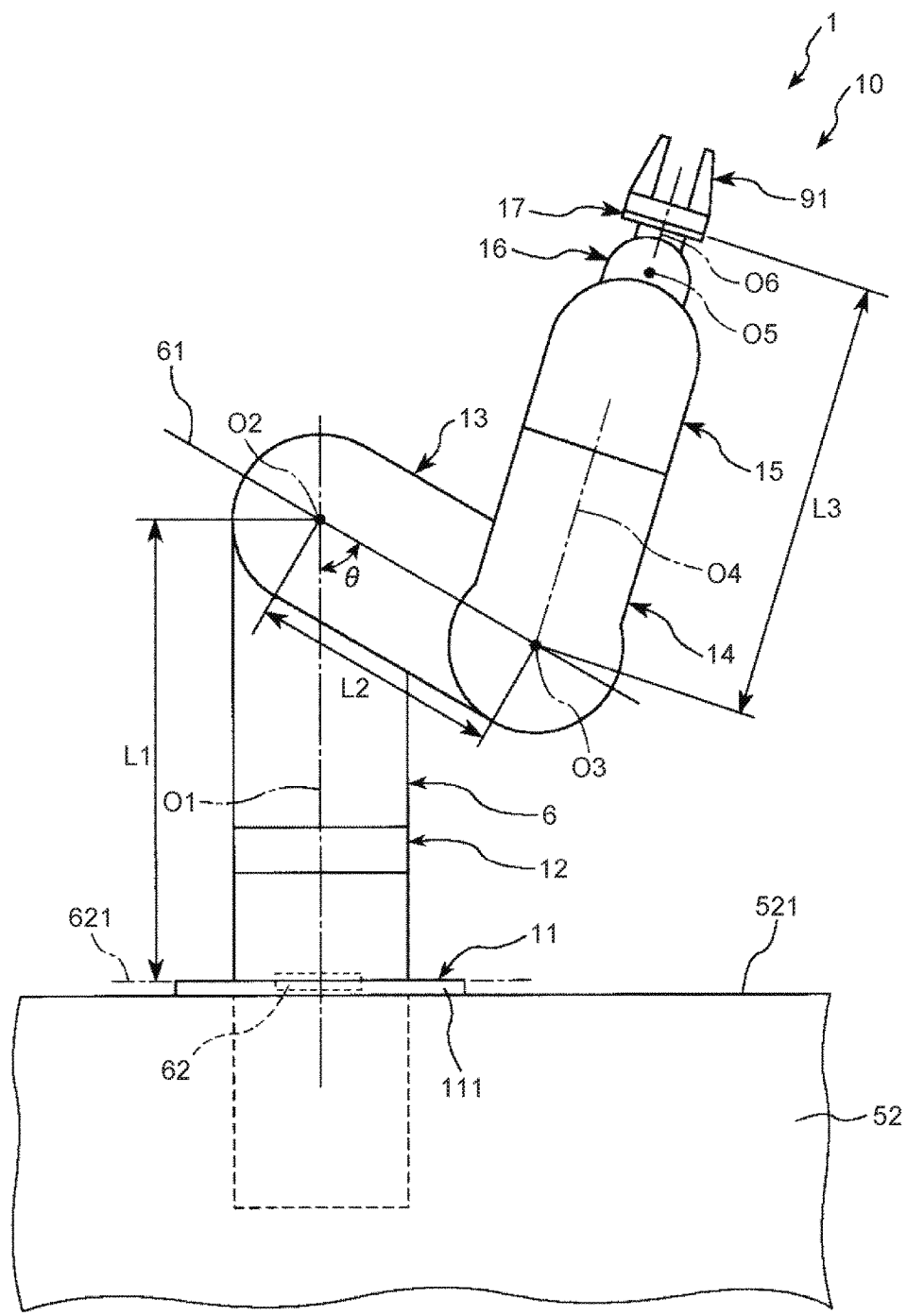
FIG. 5 is a view of the robot in a front view of the robot system illustrated in FIG. 1.
Figure 6:
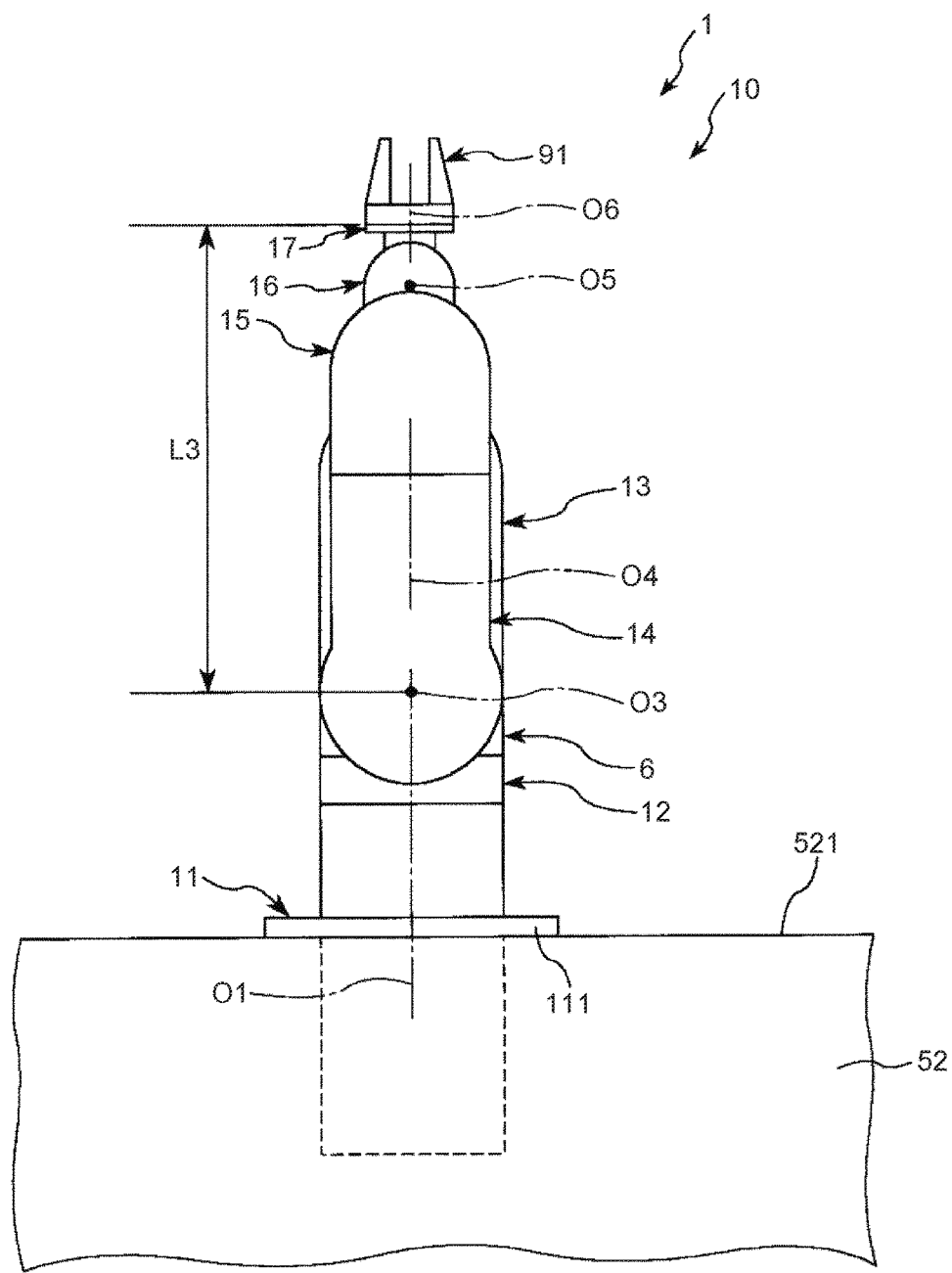
FIG. 6 is a view of the robot in a front view of the robot system illustrated in FIG. 1.
Figures 7A, 7B, 7C, 7D, 7E:
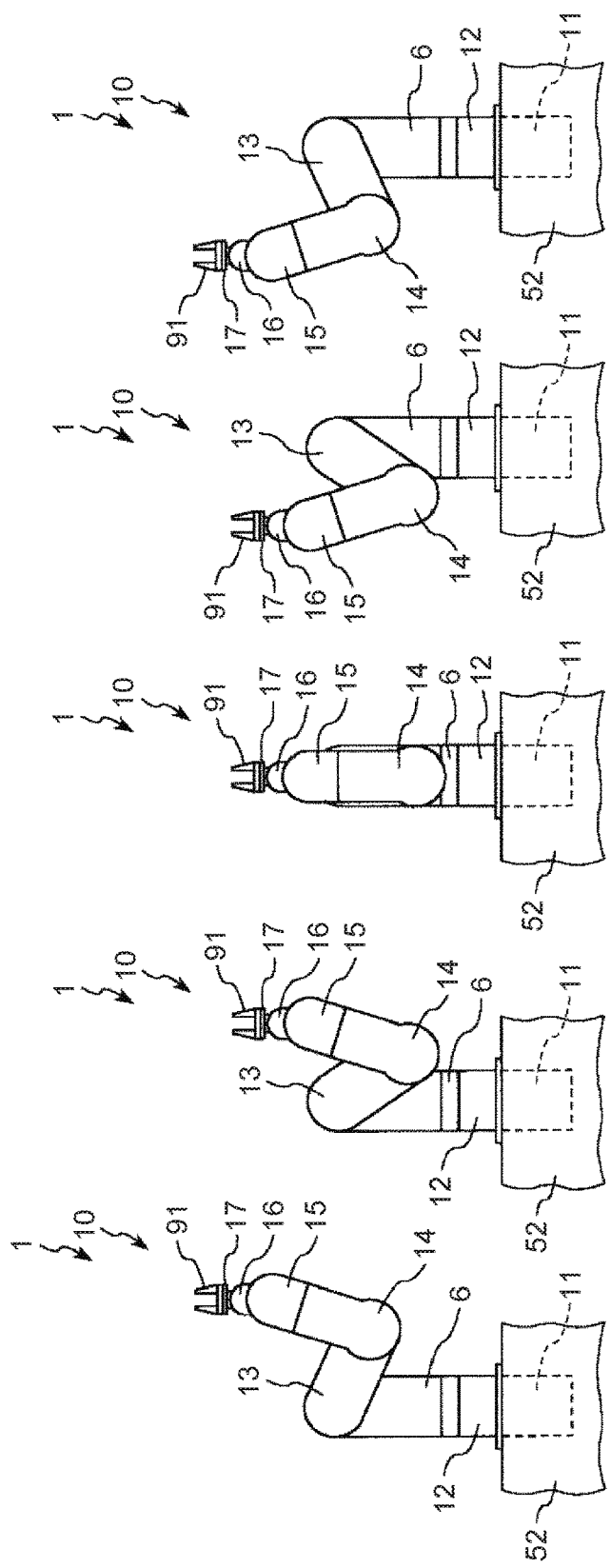
FIGS. 7A to 7E are views illustrating an operation when the robot of the robot system illustrated in FIG. 1 performs work.

FIG. 1 is a perspective view illustrating an embodiment of a robot system according to the invention. FIG. 2 is a perspective view of a robot of the robot system illustrated in FIG. 1. FIG. 3 is a schematic view of the robot the robot system illustrated in FIG. 1. FIGS. 4 to 6 are respectively views of the robot in a front view of the robot system illustrated in FIG. 1. FIGS. 7A to 7E to FIG. 14 are respectively views illustrating an operation when the robot of the robot system illustrated in FIG. 1 performs work.

In addition, hereinafter, for convenience of description, an upper side in FIGS. 1, 4 to 14 is "upper" or "upward side", and a lower side is "lower" or "downward side". In addition, a base side in FIGS. 1 to 14 is "base end" or "upstream", and a side (hand side) opposite thereto is "tip end" or "downstream". In addition, an upward-and-downward direction in FIGS. 1, and 4 to 14 is a vertical direction. In addition, in FIG. 2, a robot in a state of not being installed inside a cell is illustrated. In addition, in FIGS. 7A to 14, only a workbench in the cell is illustrated.

A robot system 100 illustrated in FIG. 1 includes a cell 5, and a robot cell 50 including a robot (industrial robot) 1 provided in the cell 5. The robot 1 includes a robot main body (main body portion) 10, and a robot control device (control portion) which is not illustrated and controls an operation of the robot main body 10 (robot 1).

The robot system 100 can be used in a manufacturing process of manufacturing a precision machine, such as a watch. In addition, the robot 1 can perform work, such as supplying, removing, transporting, and assembling a precision machine or components that configure a precision machine.

In addition, the robot control device may be disposed in the cell 5, or may be disposed outside the cell 5. In addition, when the robot control device is disposed in the cell 5, the robot control device may be embedded in the robot main body 10 (robot 1), and may be a body separated from the robot main body 10. In addition, the robot control device can be configured of a personal computer (PC) or the like in which a central processing unit (CPU) is embedded.

Cell

As illustrated in FIG. 1, the cell 5 is a member which surrounds (accommodates) the robot 1, and easily performs relocation. In the cell 5, in general, the work of assembling is performed by the robot 1.

The cell 5 includes four leg portions 54 which install the entire cell 5 in an installation space, such as floor, a frame body portion 51 which is supported by the four leg portions 54, and a workbench (base portion) 52 which is provided below the frame body portion 51. In addition, an external shape of the cell 5 when the cell 5 is viewed from the vertical direction is not particularly limited, but in the embodiment, the external shape is a square. In addition, the external shape may be an oblong shape.

The frame body portion 51 includes four columns 511 which extend in the vertical direction (upward-and-downward direction in FIG. 1), and a frame-shaped upper portion 513 which is provided at the upper ends of the four columns 511.

In the embodiment, the workbench 52 is a rectangular parallelepiped, and has quadrangles (rectangles) on six surfaces. Four corners of the workbench 52 are supported by four columns 511 of the frame body portion 51 when viewed from the vertical direction. The robot 1 can perform each work on a work surface 521 of the workbench 52.

In addition, the workbench 52 is a member which supports the robot 1, and a base 11 of the robot 1 which will be described later is fixed (supported) to the work surface (first surface) 521 of the workbench 52. The work surface 521 is a plan surface parallel to a horizontal surface.

In addition, the workbench 52 is omitted, and for example, a floor may be provided in the cell 5, the floor surface of the floor is considered as the first surface, and the base 11 of the robot 1 may be fixed (supported) to the floor surface. In addition, the floor surface is a plane surface parallel to the horizontal surface.

In addition, between the adjacent columns 511 above the workbench 52, that is, on four side surfaces of the frame body portion 51 and in the upper portion 513, respectively, a safety plate (not illustrated) may be installed to prevent an operator or foreign substances, such as dust, from infiltrating into the frame body portion 51.

In addition, the cell 5 may not have four leg port ions 54. In this case, the workbench 52 may be directly installed in the installation space.

Robot

As illustrated in FIGS. 2 to 4, the robot main body 10 includes the base (supporting portion) 11, and a robot arm 6. The robot arm 6 includes a first arm (first arm member) 12, a second arm (second arm member) 13, a third arm (third arm member) 14, a fourth arm (fourth arm member) 15, a fifth arm (fifth arm member) 16, and a sixth arm (sixth arm member) 17 (six arms); and a first driving source 401, a second driving source 402, a third driving source 403, a fourth driving source 404, a fifth driving source 405, and a sixth driving source 406 (six driving sources). In addition, a wrist is configured of the fifth arm 16 and the sixth arm 17, and for example, an end effecter including a hand 91 is configured to be attachable to and detachable from the tip end of the sixth arm 17.

The robot 1 is a vertical articulated (6 axes) robot in which the base 11, the first arm 12, the second arm 13, the third arm. 14, the fourth arm 15, the fifth arm 16, and the sixth arm 17 are linked to each other from a base end side to a tip end side in this order. In addition, hereinafter, each of the first arm 12, the second arm 13, the third arm 14, the fourth arm 15, the fifth arm 16, and the sixth arm 17 is also called an "arm". In addition, each of the first driving source 401, the second driving source 402, the third driving source 403, the fourth driving source 404, the fifth driving source 405, and the sixth driving source 406 is also called a "driving source".

As illustrated in FIGS. 1 to 4, the base 11 is a part (attached member) fixed to the work surface 521 of the workbench 52 of the cell 5. A fixing method is not particularly limited, and for example, a fixing method or the like using a plurality of bolts can be employed.

In addition, in the embodiment, the plate-shaped flange 111 provided in the tip end portion of the base 11 is attached to the work surface 521, but an attachment location to the work surface 521 of the base 11 is not limited thereto, and for example, may be on the base end surface (end surface on a lower side in FIG. 4) of the base 11.

Here, since the base 11 of the robot 1 is installed on the work surface 521, a connection part between the base 11 and the robot arm 6, that is, the center (refer to FIG. 5) of a bearing portion 62 which will be described later is positioned above the work surface (first surface) 521 in the vertical direction.

In addition, a connection part between the first arm 12 and the second arm 13, that is, the center of a bearing portion which is not illustrated and supports the second arm 13 to be rotatable is positioned above the center of the bearing portion 62 in the vertical direction.

In addition, a joint 171 which will be described later may be included or may not be included in the base 11 (refer to FIG. 3).

In addition, each of the first arm 12, the second arm 13, the third arm 14, the fourth arm 15, and the fifth arm 16, and the sixth arm 17 is supported to be displaceable being separated with respect to base 11.

As illustrated in FIGS. 2 to 4, the first arm 12 has a bent shape. If describing by using a state in FIG. 4, the first arm 12 includes a first part 121 which is connected to the base 11 and extends to an upper side of FIG. 4 in an axial direction (vertical direction) of a first rotating axis O1 which will be described later from the base 11, a second part 122 which extends to aright side of FIG. 4 in an axial direction (horizontal direction) of a second rotating axis O2 from an upper end of the first part 121 in FIG. 4, a third part 123 which is provided in an end portion of the second part 122 opposite to the first part 121, and extends to the upper side of FIG. 4 in the axial direction (vertical direction) of the first rotating axis O1, and a fourth part 124 which extends to a left side of FIG. 4 in the axial direction (horizontal direction) of the second rotating axis O2 from an end portion of the third part 123 opposite to the second part 122. In addition, the first part 121, the second part 122, the third part 123, and the fourth part 124 are formed to be integrated. In addition, when viewed from a direction orthogonal to both the first rotating axis O1 and the second rotating axis O2 (when viewed from a near side of a paper surface of FIG. 4), the second part 122 and the third part 123 are substantially orthogonal (intersect) to each other.

The second arm 13 has a longitudinal shape, and is connected to a tip end portion of the first arm 12, that is, an end portion opposite to the third part 123 in the fourth part 124.

The third arm 14 has a longitudinal shape, and is connected to a tip end portion of the second arm 13, that is, an end portion opposite to the end portion to which the first arm 12 is connected in the second arm 13.

The fourth arm 15 is connected to a tip end portion of the third arm 14, that is, an end portion opposite to the end portion to which the second arm. 13 is connected in the third arm 14. The fourth arm 15 includes one pair of supporting portions 151 and 152 which oppose each other. The supporting portions 151 and 152 are used in connection with the fifth arm 16 in the fourth arm 15.

The fifth arm 16 is positioned between the supporting portions 151 and 152, and is linked to the fourth arm 15 as being connected to the supporting portions 151 and 152.

The sixth arm 17 has a shape of a flat plate, and is connected to a base end portion of the fifth arm 16. In addition, in a tip end portion (an end portion opposite to the fifth arm 16) of the sixth arm 17, the hand 91 which grabs a precision machine, such as a watch, and components is mounted to be attachable and detachable as an end effector. The driving of the hand 91 is controlled by the robot control device. In addition, the hand 91 is not particularly limited, and an example thereof includes a configuration in which a plurality of finger portions (fingers) are provided. In addition, while grabbing the precision machine and components by the hand 91, the robot 1 can perform each type of work, such as transporting the precision machine and components by controlling the operations of the arms 12 to 17.

As illustrated in FIGS. 2 to 4, the base 11 and the first arm 12 are linked to each other via the joint 171. The joint 171 includes a mechanism which supports the first arm 12 linked to the base 11 to be rotatable with respect to the base 11. Accordingly, the first arm 12 can rotate around the first rotating axis O1 (around the first rotating axis O1) parallel to the vertical direction, with respect to the base 11. The first rotating axis O1 matches a normal line of the work surface 521 of the workbench 52 to which the base 11 is attached. In addition, the first rotating axis O1 is a rotating axis which is furthest on the upstream side of the robot 1. The rotation around the first rotating axis O1 is performed by driving the first driving source 401 which includes a motor 401M. In addition, the first driving source 401 is driven by the motor 401M and a cable (not illustrated), and the motor 401M is controlled by a robot control device via an electrically connected motor driver 301. In addition, the first driving source 401 may be configured to transfer a driving force from the motor 401M by a speed reducer (not illustrated) provided together with the motor 401M, or the speed reducer may be omitted.

In addition, the first arm 12 and the second arm 13 are linked to each other via a joint 172. The joint 172 includes a mechanism which supports one of the first arm 12 and the second arm 13 that are linked to each other to be rotatable with respect to the other. Accordingly, the second arm 13 can rotate around the second rotating axis O2 (around the second rotating axis O2) parallel to the horizontal direction, with respect to the first arm 12. The second rotating axis O2 is orthogonal to the first rotating axis O1. The rotation around the second rotating axis O2 is performed by driving the second driving source 402 which includes a motor 402M. In addition, the second driving source 402 is driven by the motor 402M and a cable (not illustrated), and the motor 402M is controlled by a robot control device via an electrically connected motor driver 302. In addition, the second driving source 402 may be configured to transfer a driving force from the motor 402M by a speed reducer (not illustrated) provided together with the motor 402M, or the speed reducer may be omitted. In addition, the second rotating axis O2 may be parallel to an axis which is orthogonal to the first rotating axis O1 and the second rotating axis O2 may not be orthogonal to the first rotating axis O1, or the axial directions may be different from each other.

In addition, the second arm 13 and the third arm 14 are linked to each other via a joint 173. The joint 173 includes a mechanism which supports one of the second arm 13 and the third arm 14 that are linked to each other to be rotatable with respect to the other. Accordingly, the third arm 14 can rotate around a third rotating axis O3 (around the third rotating axis O3) parallel to the horizontal direction, with respect to the second arm 13. The third rotating axis O3 is parallel to the second rotating axis O2. The rotation around the third rotating axis O3 is performed by driving the third driving source 403. In addition, the third driving source 403 is driven by a motor 403M and a cable (not illustrated), and the motor 403M is controlled by a robot control device via an electrically connected motor driver 303. In addition, the third driving source 403 may be configured to transfer a driving force from the motor 403M by a speed reducer (not illustrated) provided together with the motor 403M, or the speed reducer may be omitted.

In addition, the third arm 14 and the fourth arm 15 are linked to each other by a joint 174. The joint 174 includes a mechanism which supports one of the third arm 14 and the fourth arm 15 that are linked to each other to be rotatable with respect to the other. Accordingly, the fourth arm 15 can rotate around a fourth rotating axis O4 (around the fourth rotating axis O4) parallel to a central axial direction of the third arm 14, with respect to the third arm 14 (base 11). The fourth rotating axis O4 is orthogonal to the third rotating axis O3. The rotation around the fourth rotating axis O4 is performed by driving the fourth driving source 404. In addition, the fourth driving source 404 is driven by a motor 404M and a cable (not illustrated), and the motor 404M is controlled by a robot control device via an electrically connected motor driver 304. In addition, the fourth driving source 404 may be configured to transfer a driving force from the motor 404M by a speed reducer (not illustrated) provided together with the motor 404M, or the speed reducer may be omitted. In addition, the fourth rotating axis O4 may be parallel to the axis which is orthogonal to the third rotating axis O3 and the fourth rotating axis O4 may not be orthogonal to the third rotating axis O3, or the axial directions may be different from each other.

In addition, the fourth arm 15 and the fifth arm 16 are linked to each other by a joint 175. The joint 175 includes a mechanism which supports one of the fourth arm 15 and the fifth arm 16 that are linked to each other to be rotatable with respect to the other. Accordingly, the fifth arm 16 can rotate around a fifth rotating axis O5 (around the fifth rotating axis O5) orthogonal to a central axial direction of the fourth arm 15, with respect to the fourth arm 15. The fifth rotating axis O5 is orthogonal to the fourth rotating axis O4. The rotation around the fifth rotating axis O5 is performed by driving the fifth driving source 405. In addition, the fifth driving source 405 is driven by a motor 405M and a cable (not illustrated), and the motor 405M is controlled by a robot control device via an electrically connected motor driver 305. In addition, the fifth driving source 405 may be configured to transfer a driving force from the motor 405M by a speed reducer (not illustrated) provided together with the motor 405M, or the speed reducer may be omitted. In addition, the fifth rotating axis O5 may be parallel to the axis which is orthogonal to the fourth rotating axis O4 and the fifth rotating axis O5 may not be orthogonal to the fourth rotating axis O4, or the axial directions may be different from each other.

In addition, the fifth arm 16 and the sixth arm 17 are linked to each other by a joint 176. The joint 176 includes a mechanism which supports one of the fifth arm 16 and sixth arm 17 that are linked to each other to be rotatable with respect to the other. Accordingly, the sixth arm 17 can rotate around a sixth rotating axis O6 (around the sixth rotating axis O6), with respect to the fifth arm 16. The sixth rotating axis O6 is orthogonal to the fifth rotating axis O5. The rotation around the sixth rotating axis O6 is performed by driving the sixth driving source 406. In addition, the sixth driving source 406 is driven by a motor 406M and a cable (not illustrated), and the motor 406M is controlled by a robot control device via an electrically connected motor driver 306. In addition, the sixth driving source 406 may be configured to transfer a driving force from the motor 406M by a speed reducer (not illustrated) provided together with the motor 406M, or the speed reducer may be omitted. In addition, the sixth rotating axis O6 may be parallel to the axis which is orthogonal to the fifth rotating axis O5 and the sixth rotating axis O6 may not be orthogonal to the fifth rotating axis O5, or the axial directions may be different from each other.

Above, the configuration of the robot 1 is simply described.

Next, a relationship between the first arm 12 to the sixth arm 17 will be described, but will be described from various points of view changing the expressions or the like. In addition, regarding the third arm 14 to the sixth arm 17, a state where the arms are straightly extended, that is, a state of being the longest or a state where the fourth rotating axis O4 and the sixth rotating axis O6 match each other or are parallel to each other, is considered.

First, as illustrated in FIG. 5, a length L1 of the first arm 12 is set to be longer than a length L2 of the second arm 13.

Here, the length L1 of the first arm 12 is a distance between the second rotating axis O2 and a center line 621 which extends in a leftward-and-rightward direction in FIG. 5 of the bearing portion 62 which supports the first arm 12 to be rotatable, when viewed from the axial direction of the second rotating axis O2.

In addition, the length L2 of the second arm 13 is a distance between the second rotating axis O2 and the third rotating axis O3, when viewed from the axial direction of the second rotating axis O2.

In addition, as illustrated in FIG. 6, it is configured that an angle θ made by the first arm 12 and the second arm 13 can be 0°, when viewed from the axial direction of the second rotating axis O2. In other words, it is configured to make it possible to make the first arm 12 and the second arm 13 overlap each other, when viewed from the axial direction of the second rotating axis O2.

In addition, when the angle θ is 0°, that is, when the first arm 12 and the second arm 13 overlap each other when viewed from the axial direction of the second rotating axis O2, the second arm 13 is configured not to interfere with the work surface 521 of the workbench 52 provided with the base 11 and the second part 122 of the first arm 12. In addition, in a case where the base end surface of the base 11 is attached to the work surface 521, the second arm 13 is configured not to interfere with the work surface 521 and the second part 122 of the first arm 12.

Here, the angle θ made by the first arm 12 and the second arm 13 is an angle made by a straight line (a center axis of the second arm 13 when viewed from the axial direction of the second rotating axis O2) 61 which passes through the second rotating axis O2 and the third rotating axis O3, and the first rotating axis O1, when viewed from the axial direction of the second rotating axis O2.

In addition, it is possible to move the tip end of the second arm 13 to a position different by 180° around the first rotating axis O1 via a state (a state where the first arm 12 and the second arm 13 overlap each other) the angle becomes 0° when viewed from the axial direction of the second rotating axis O2, by rotating the second arm 13 arm without rotating the first arm 12 (refer to FIGS. 7A to 7E). In other words, it is possible to move the tip end (the tip end of the sixth arm 17) of the robot arm 6 to a second position illustrated in FIG. 7E different by 180° around the first rotating axis O1 via a state where the angle θ is 0° from a first position illustrated in FIG. 7A, by rotating the second arm 13 without rotating the first arm 12 (refer to FIGS. 7A to 7E). In addition, each of the third arm 14 to sixth arm 17 is rotated as necessary.

In addition, when the tip end of the second arm 13 is moved to a position different by 180° around the first rotating axis O1 (when the tip end of the robot arm 6 is moved to the second position from the first position), when viewed from the axial direction of the first rotating axis O1, the tip end of the second arm 13 and the tip end of the robot arm 6 move on a straight line.

In addition, the length L3 of the total length of the third arm 14 to the sixth arm 17 is set to be longer than the length L2 of the second arm 13.

Accordingly, when viewed from the axial direction of the second rotating axis O2, in a case where the second arm 13 and the third arm 14 overlap each other, the tip end of the sixth arm 17 can protrude from the second arm 13. Accordingly, it is possible to prevent the hand 91 from interfering with the first arm 12 and the second arm 13.

Here, the length L3 which is the total length of the third arm. 14 to the sixth arm 17 is a distance between the third rotating axis O3 and the tip end of the sixth arm 17, when viewed from the axial direction of the second rotating axis O2 (refer to FIG. 5). In this case, the third arm 14 to the sixth arm 17 are in a state where the fourth rotating axis O4 and the sixth rotating axis O6 match each other as illustrated in FIG. 5, or in a state where the fourth rotating axis O4 and the sixth rotating axis O6 are parallel to each other.

In addition, as illustrated in FIG. 6, when viewed from the axial direction of the second rotating axis O2, the second arm 13 and the third arm 14 are configured to overlap each other.

In other words, when viewed from the axial direction of the second rotating axis O2, the first arm 12, the second arm 13, and the third arm 14 are configured to overlap each other at the same time.

In the robot 1, since the above-described relationship is satisfied, it is possible to move the hand 91 (the tip end of the sixth arm 17) to a position different by 180° around the first rotating axis O1 via a state (state where the first arm. 12 and the second arm. 13 overlap each other) where the angle θ made by the first arm 12 and the second arm 13 becomes 0° when viewed from the axial direction of the second rotating axis O2, by rotating the second arm 13 and the third arm 14 without rotating the first arm 12. In addition, by using this operation, it is possible to more effectively drive the robot 1, and to reduce the space for preventing interference of the robot 1. Additionally, various advantages which will be described as follows are achieved.

In addition, since the robot 1 has the above-described configuration, it is possible to reduce the space for installing the robot 1, that is, the cell 5 to be smaller than that in the related art. Accordingly, it is possible to reduce an area (installation area) of the installation space for installing the cell 5, that is, an area S of the cell 5 when the cell 5 is viewed from the vertical direction, to be smaller than that in the related art. Specifically, the area S can be equal to or less than 64% of the area in the related art. For this reason, a width W (the length of one side in the horizontal direction) of the cell can be smaller than a width in the related art, and specifically, for example, can be equal to or less than 80% of the width in the related art. In addition, as described above, in the embodiment, the cell 5 is a square when viewed from the vertical direction. For this reason, in the embodiment, the width (depth) W of the cell 5 in the longitudinal direction in FIG. 1, and the width (lateral width) W of the cell 5 in the lateral direction in FIG. 1 are the same, but the widths may be different from each other. In this case, any one of the widths W or both the widths W can be equal to or less than 80% of the width in the related art.

In addition, it is preferable that the area S is less than 637, 500 mm$^2$, it is more preferable that the area S is equal to or less than 500,000 mm$^2$, it is still more preferable that the area S is equal to or less than 400,000 mm$^2$, and it is particularly preferable that the area S is equal to or less than 360,000 mm$^2$. Even in the area S, it is possible to reduce the space for preventing interference of the robot 1 with the cell 5 when the tip end of the second arm 13 is moved to a position different by 180° around the second rotating axis. For this reason, it is possible to reduce the size of the cell 5, and to reduce the installation space for installing the robot system 100. For this reason, for example, when a manufacturing line is configured by aligning a plurality of robot cells 50, it is possible to suppress the length of the production line not to be longer.

In addition, the area S which is equal to or less than 400,000 mm$^2$ is substantially equivalent to, or equal to or less than the size of a work region where a human operator works. For this reason, when the area S is equal to or less than 400,000=$^2$, for example, it is possible to easily perform exchange between the human operator and the robot cell 50. Accordingly, it is possible to change the manufacturing line by exchanging the human operator and the robot cell 50. In addition, it is preferable that the area S is equal to or greater than 10,000 mm$^2$. Accordingly, it is possible to easily perform maintenance of the inside of the robot cell 50.

In addition, specifically, it is preferable that the width W is less than 850 mm, it is more preferable that the width W is less than 750 mm, and it is still more preferable that the width W is equal to or less than 650 mm. Accordingly, it is possible to sufficiently show effects similar to the above-described effects. In addition, the width W is an average width (average width of the frame body portion 51) of the cell 5. In addition, it is preferable that the width W is equal to or greater than 100 mm. Accordingly, it is possible to easily perform maintenance of the inside of the robot cell 50.

In addition, since the robot 1 has the above-described configuration, it is possible to reduce the height (length in the vertical direction) L of the cell 5 to be lower than the height in the related art. Specifically, it is possible to make the height L of the cell 5 to be equal to or less than 80% of the height in the related art.

In addition, specifically, it is preferable that the height L is equal to or less than 1,700 mm, and it is more preferable that the height L is 1,000 mm to 1,650 mm. When the height L is equal to or less than the upper limit value, it is possible to further suppress the influence of oscillation when the robot 1 is operated in the cell 5. In addition, the above-described height L is an average height of the cell 5 including the leg portion 54.

Figure 8:
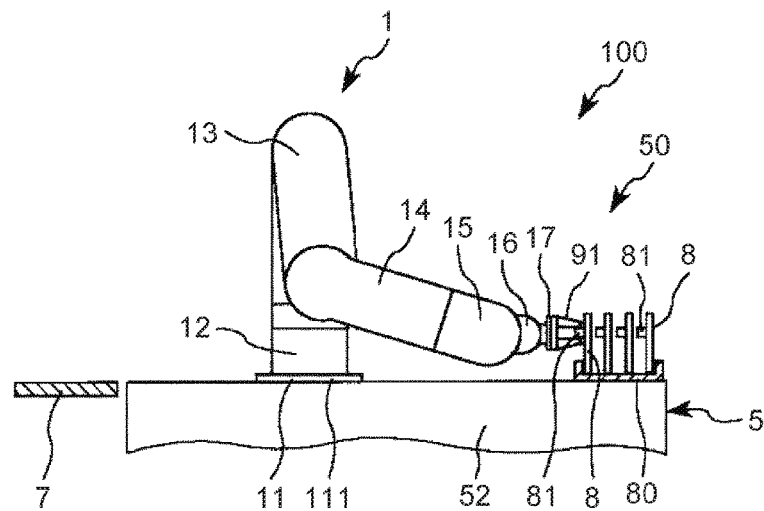
FIG. 8 is a view illustrating an operation when the robot of the robot system illustrated in FIG. 1 performs work.

Next, two configuration examples of the operation of the robot 1 when the robot 1 performs work of supplying, removing, transporting, and assembling will be described. In this case, as illustrated in FIG. 8, a belt conveyor 7 is installed on a left side of FIG. 8 of the workbench 52. In addition, the belt conveyor 7 may be installed at a position which is higher than in the illustrated configuration so that fine particles or the like are not adhered to the transported object.

First, in the first work, a rack 80 on which a plurality of substrates (workpieces) 8 are perpendicularly disposed is loaded on the workbench 52, and the robot 1 takes out the substrates 8 from the rack 80, and transports the substrates 8 to the belt conveyor 7. In this case, the rack 80 is disposed to a position rotated approximately by 180° from a position to which the substrate 8 of the belt conveyor 7 is transported, around the first rotating axis O1 of the robot 1.

Figure 9:
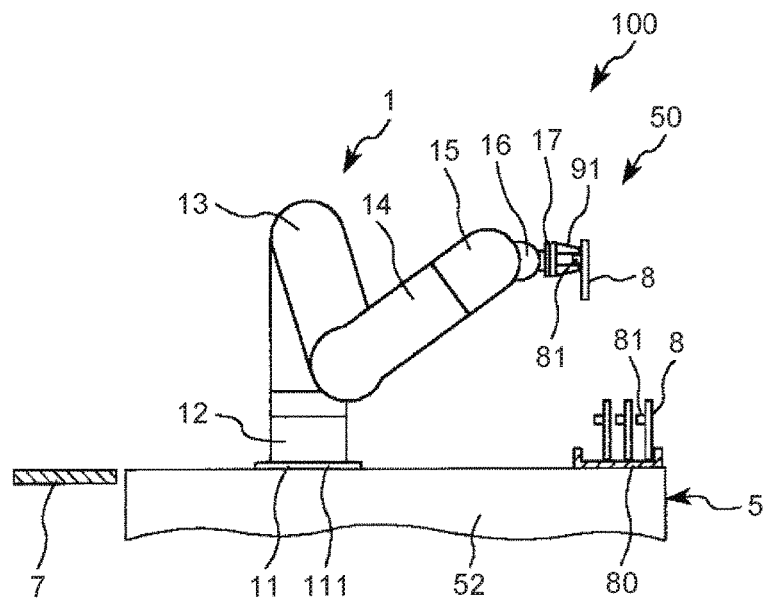
FIG. 9 is a view illustrating an operation when the robot of the robot system illustrated in FIG. 1 performs work.
Figure 10:
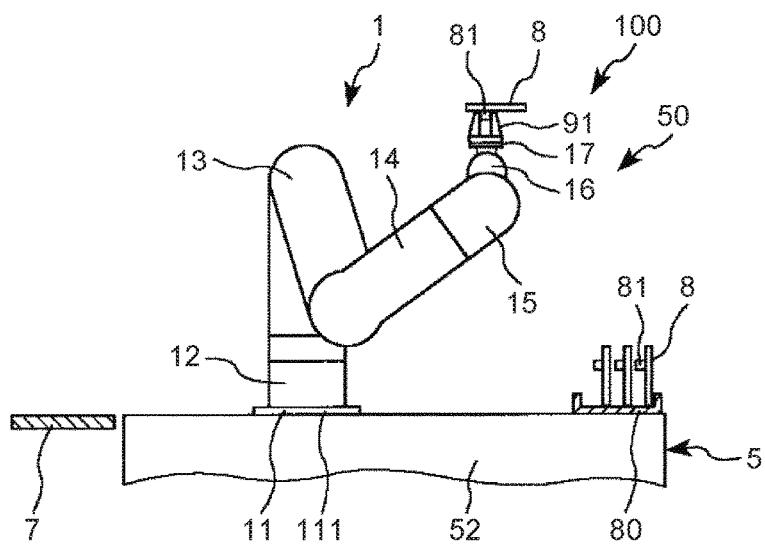
FIG. 10 is a view illustrating an operation when the robot of the robot system illustrated in FIG. 1 performs work.

In this work, first, the robot 1 grabs a convex portion 81 of the substrate 8 disposed on the rack 80 by the hand 91 as illustrated in FIG. 8, maintains a perpendicular posture of the substrate 8 as illustrated in FIG. 9, moves the substrate 8 (tip end of the robot arm 6) upward in the vertical direction, and finally, makes the substrate 8 to be in a horizontal posture as illustrated in FIG. 10.

Figure 11:
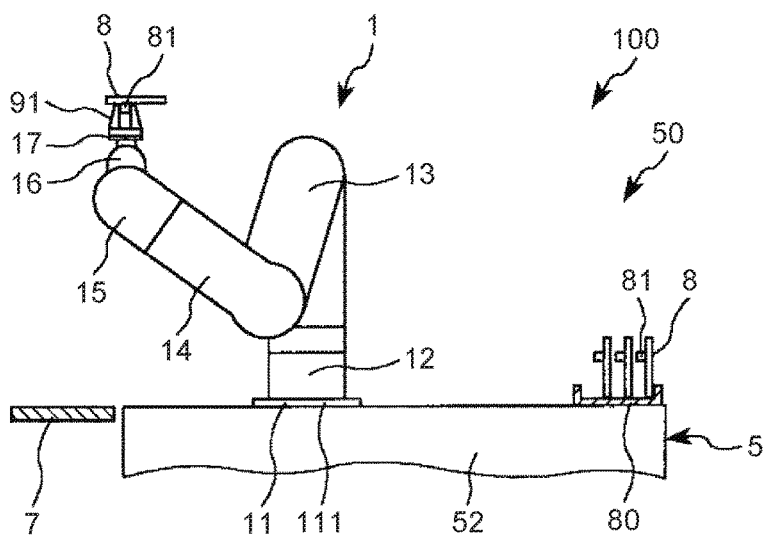
FIG. 11 is a view illustrating an operation when the robot of the robot system illustrated in FIG. 1 performs work.

Next, as illustrated in FIG. 11, while maintaining the horizontal posture of the substrate 8, and the height (position in the vertical direction) of the substrate 8 (tip end of the robot arm 6) to be constant, the robot 1 moves the substrate 8 in a direction of the belt conveyor 7 which is a horizontal direction.

At this time, the robot 1 rotates the second arm 13, the third arm 14, and the fifth arm 16 without rotating the first arm 12. For this reason, when viewed from the axial direction of the first rotating axis O1, the tip end of the second arm 13 and the tip end of the robot arm 6 move on the straight line. In addition, as necessary, fine adjustment may be performed by rotating arbitrary one of the first arm 12, the fourth arm 15, and the sixth arm 17.

Figure 12:
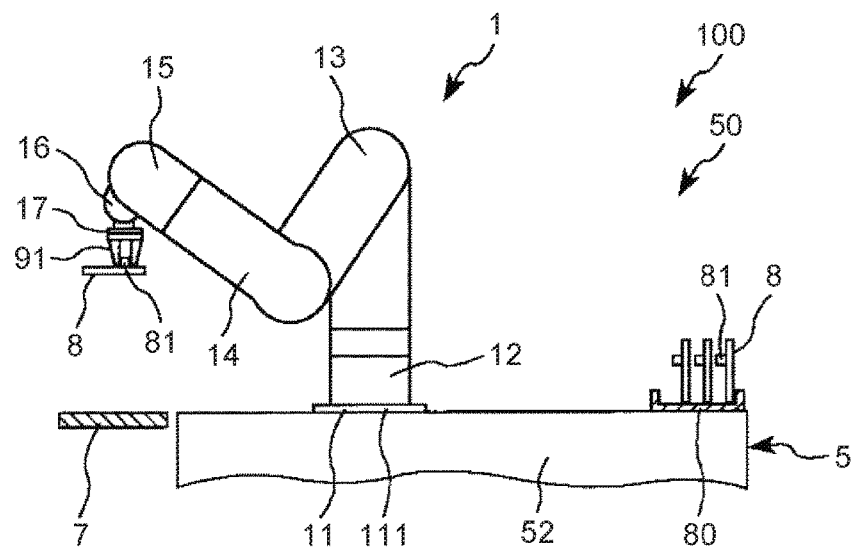
FIG. 12 is a view illustrating an operation when the robot of the robot system illustrated in FIG. 1 performs work.
Figure 13:
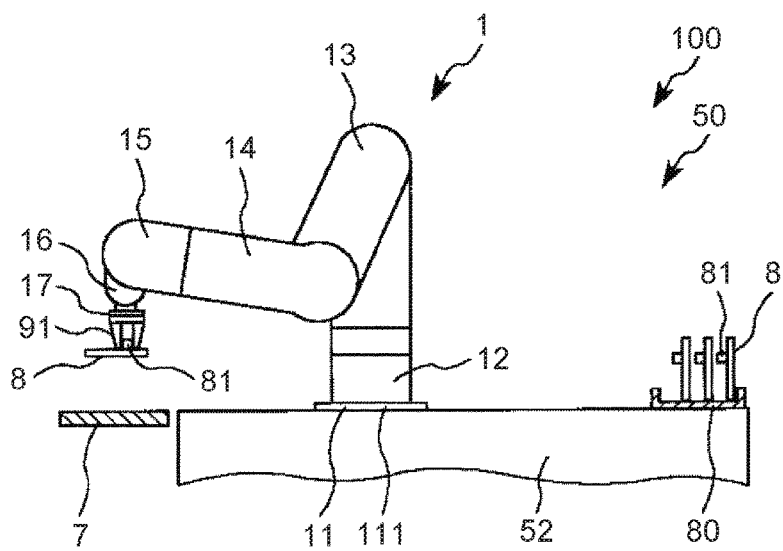
FIG. 13 is a view illustrating an operation when the robot of the robot system illustrated in FIG. 1 performs work.
Figure 14:
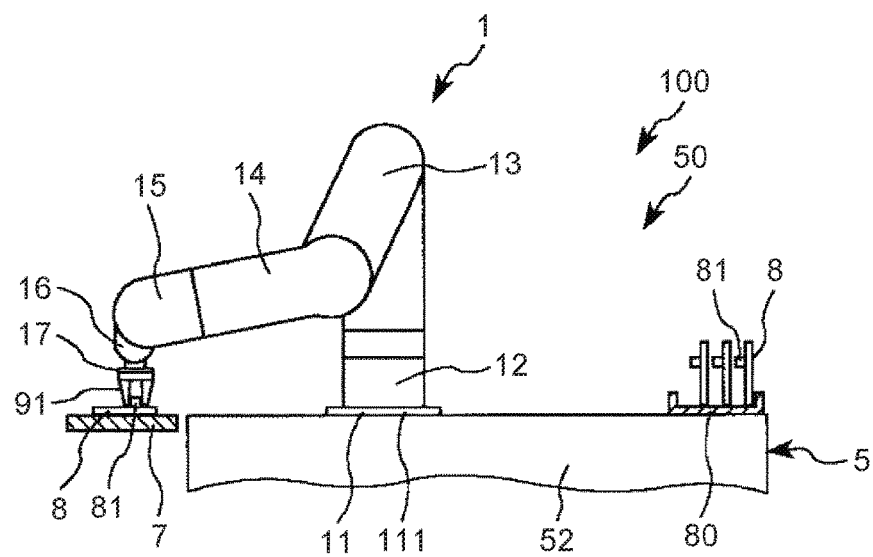
FIG. 14 is a view illustrating an operation when the robot of the robot system illustrated in FIG. 1 performs work.

Next, as illustrated in FIG. 12, the robot 1 reverses the substrate 8 upside down. In addition, maintaining the horizontal posture of the substrate 8, the robot 1 moves the substrate 8 downward in the vertical direction as illustrated in FIG. 13, and the robot 1 loads the substrate 8 on the belt conveyor 7 as illustrated in FIG. 14.

In addition, the substrate 8 is transported to a position of the next cell by the belt conveyor 7, and for example, predetermined processing, such as deposition, is performed.

In the second work, after the predetermined processing, such as deposition, is performed with respect to the substrate 8, the substrate 8 which is transported by the belt conveyor 7 is grabbed, transported to a rack 85, and disposed perpendicularly. In other words, in the second work, the movement of the robot 1 is reverse to that in the first work.

After this, the operations similar to the above-described operations are repeated.

As described above in two examples, since it is possible to move the tip end of the robot arm 6 in the vertical direction and the horizontal direction, and the tip end of the second arm 13 and the tip end of the robot arm 6 move on the straight line when viewed from the axial direction of the first rotating axis O1 by rotating the second arm 13, the third arm 14, and the fifth arm 16 without rotating the first arm 12, the robot 1 can perform the work even in a narrow work region. In other words, it is possible to reduce the space for preventing the interference of the robot 1.

As described above, in the robot system 100, the robot 1 can move the hand 91 (tip end of the robot arm 6) to a position different by 180° around the first rotating axis O1 via a state (state where the first arm 12 and the second arm 13 overlap each other) where the angle θ made by the first arm 12 and the second arm 13 is 0° when viewed from the axial direction of the second rotating axis O2, by rotating the second arm. 13, the third arm. 14 or the like, without rotating the first arm 12. Therefore, it is possible to reduce the space for preventing the interference of the robot 1. Accordingly, it is possible to reduce the size of the cell 5, and to reduce the installation space for installing the robot system 100. In addition, for example, it is possible to dispose many robot systems 100 per unit length along the production line, and to shorten the production line.

In addition, when the hand 91 is moved, it is possible to reduce the movement of the robot 1. For example, the first arm 12 is not rotated, or the rotation angle of the first arm 12 can be reduced, and accordingly, it is possible to shorten the duct time, and to improve the work efficiency.

In addition, by installing the base 11 of the robot 1 on the workbench 52 in the cell 5, the position of the center of gravity of the robot 1 becomes lower compared to a case where the robot 1 is installed on a ceiling or a wall of the cell, and it is possible to reduce the influence of oscillation of the robot 1. In other words, it is possible to suppress oscillation generated by a counterforce by the operation of the robot 1.

In addition, by installing the base 11 of the robot 1 on the workbench 52 in the cell 5, it is possible to simplify the configuration for the installation, and to easily and rapidly perform the installation work of the robot 1.

In addition, by installing the base 11 of the robot 1 on the workbench 52 in the cell 5, it is possible to prevent the fine particles or the like coming out of the robot 1 from being adhered to a target object in the work, compared to a case where the robot 1 is installed on a ceiling or a wall of the cell.

Above, the robot and the robot system according to the invention are described based on the embodiment illustrated in the drawings, but the invention is not limited thereto, and configurations of each portion can be replaced with arbitrary configuration having similar functions. In addition, another arbitrary configuration elements may be added.

In addition, in the embodiment, the robot is installed in the cell, but the invention is not limited thereto, and for example, the cell may be omitted. In this case, examples of a fixing location of the base 11 include a floor, a workbench, and ground of the installation space.

In addition, in the embodiment, the first surface is parallel to the horizontal surface, but the invention is not limited thereto, and for example, the first surface may be inclined with respect to the horizontal surface. In other words, the first rotating axis may be inclined with respect to the perpendicular direction.

In addition, in the embodiments, with respect to the condition (relationship) of the n-th rotating axis, the n-th arm, the (n+1)th rotating axis, and the (n+1)th arm which are regulated within the range of the appended claims, a case where the condition is satisfied when n is 1, that is, in case of a first rotating axis, a first arm, a second rotating axis, and a second arm, is described. However, the invention is not limited thereto, and n may be an integer which is equal to or greater than 1, and in a case where n is an arbitrary integer which is equal to or greater than 1, the condition which is similar to the case where n is 1 may be satisfied. Therefore, for example, when n is 2, that is, in case of a second rotating axis, a second arm, a third rotating axis, and a third arm, the condition which is similar to the case where n is 1 may be satisfied. When n is 3, that is, in case of a third rotating axis, a third arm, a fourth rotating axis, and a fourth arm, the condition which is similar to the case where n is 1 may be satisfied. When n is 4, that is, incase of a fourth rotating axis, a fourth arm, a fifth rotating axis, and a fifth arm, the condition which is similar to the case where n is 1 may be satisfied. In addition, when n is 5, that is, in case of a fifth rotating axis, a fifth arm, a sixth rotating axis, and a sixth arm, the condition which is similar to the case where n is 1 may be satisfied.

In addition, in the embodiment, the number of rotating axes of the robot arm is six, but the invention is not limited thereto, and the number of rotating axes of the robot arm may be two, three, four, five, seven or more. In other words, in the embodiment, the number of arms (links) is six, but in the invention, the number is not limited thereto, and the number of arms may be two, three, four, five, seven or more.

In addition, in the embodiment, the number of robot arms is one, but the invention is not limited thereto, and the number of robot arms may be two or more. In other words, the robot (robot main body) may be a robot having a plurality of arms, such as a robot having two arm.

In addition, in the invention, the robot (robot main body) may be a robot having another shape. A specific example thereof includes a leg-type walking (traveling) robot having a leg portion.

The entire disclosure of Japanese Patent Application No. 2015-071203, filed Mar. 31, 2015 is expressly incorporated by reference herein.

What is claimed is:

1. A robot comprising:
a base which is provided on a first surface;
a robot arm which is provided on the base; and
a connection part which is provided between the base and the robot arm,
wherein the robot arm includes an integrally formed n-th (n is an integer which is equal to or greater than 1) arm and an (n+1)th arm,
wherein the n-th arm rotates around an n-th rotating axis,
wherein the (n+1)th arm is provided to rotate around an (n+1)th rotating axis which is an axial direction different from an axial direction of the n-th rotating axis, in the n-th arm,
wherein the n-th arm includes a first leg extending in a direction along the (n+1)th rotating axis integrally formed with a second leg extending in a direction along the n-th rotating axis such that the first leg and the second leg are a single monolithic piece and the first leg and the second leg, together, rotate about the n-th rotating axis,
wherein a length of the second leg of the n-th arm is longer than a length of the (n+1)th arm such that, when viewed from the axial direction of the (n+1)th rotating axis, the second leg of the n-th arm and the (n+1)th arm overlap each other in a folded position and the (n+1)th arm is nested within the n-th arm, and
at least a portion of the base is positioned on an opposite side of the first surface as the connection part.

2. The robot according to claim 1,
wherein a tip end of the robot arm is moved from a first position to a second position different by 180° around the n-th rotating axis via a state where an angle made by the n-th arm and the (n+1)th arm becomes 0° when viewed from the axial direction of the (n+1)th rotating axis, by rotating the (n+1)th arm without rotating the n-th arm.

3. The robot according to claim 1,
wherein a tip end of the robot arm moves in a horizontal direction.

4. The robot according to claim 1,
wherein a tip end of the robot arm moves in the vertical direction.

5. The robot according to claim 1,
wherein the first surface is parallel to a horizontal surface.

6. A robot system comprising:
a cell which includes a first surface; and
a robot which includes a base provided on the first surface, a robot arm provided on the base, and a connection part provided between the base and the robot arm,
wherein the robot arm includes an integrally formed n-th (n is an integer which is equal to or greater than 1) arm and an (n+1)th arm,
wherein the n-th arm rotates around an n-th rotating axis,
wherein the (n+1)th arm is provided to rotate around an (n+1)th rotating axis which is an axial direction different from an axial direction of the n-th rotating axis, in the n-th arm,
wherein the n-th arm includes a first leg extending in a direction along the (n+1)th rotating axis integrally formed with a second leg extending in a direction along the n-th rotating axis such that the first leg and the second leg are a single monolithic piece and the first leg and the second leg, together, rotate about the n-th rotating axis,
wherein a length of the second leg of the n-th arm is longer than a length of the (n+1)th arm such that, when viewed from the axial direction of the (n+1)th rotating axis, the second leg of the n-th arm and the (n+1)th arm overlap each other in a folded position and the (n+1)th arm is nested within the n-th arm, and
at least a portion of the base is positioned on an opposite side of the first surface as the connection part.

7. The robot according to claim 1,
further comprising a workbench having the first surface as a working surface, the working surface including a first side and a second side opposite the first side,
wherein part of the base is disposed on the second side of the working surface, the robot arm is disposed on the first side of the working surface, and an interface between the base and the robot arm is on the first side of the working surface.

8. The robot according to claim 1,
wherein the first surface is a working surface of a workbench,
the connection part is a bearing rotatably connecting the robot arm to the base, and
a portion of the base is disposed on a first side of the working surface and the bearing is on a second side of the working surface, opposite the first side.

* * * * *